(12) United States Patent
Blonde et al.

(10) Patent No.: US 7,769,242 B2
(45) Date of Patent: Aug. 3, 2010

(54) METHOD AND DEVICE FOR PROCESSING A MOSAIC OF IMAGES

(75) Inventors: Laurent Blonde, Thorigne Fouillard (FR); Didier Doyen, La Bouexiere (FR); Thierry Borel, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 1259 days.

(21) Appl. No.: 11/312,813

(22) Filed: Dec. 20, 2005

(65) Prior Publication Data

US 2006/0187509 A1 Aug. 24, 2006

(30) Foreign Application Priority Data

Jan. 6, 2005 (FR) .................................... 05 50052

(51) Int. Cl.
*G06K 9/38* (2006.01)
*G06K 9/36* (2006.01)
*G03H 1/26* (2006.01)

(52) U.S. Cl. ......................... 382/272; 382/284; 359/23
(58) Field of Classification Search ....................... None
See application file for complete search history.

(56) References Cited

U.S. PATENT DOCUMENTS

| | | | |
|---|---|---|---|
| 4,589,140 A * | 5/1986 | Bishop et al. ............... | 382/148 |
| 5,010,504 A | 4/1991 | Lee et al. | |
| 6,075,905 A * | 6/2000 | Herman et al. ............... | 382/284 |
| 6,748,347 B1 * | 6/2004 | Dalton ........................... | 703/5 |
| 7,142,249 B2 * | 11/2006 | Hahn et al. .................. | 348/458 |
| 7,539,356 B2 * | 5/2009 | Igari et al. ................... | 382/284 |
| 2002/0034337 A1 * | 3/2002 | Shekter ....................... | 382/275 |

FOREIGN PATENT DOCUMENTS

EP 1494170 A 1/2005

OTHER PUBLICATIONS

Jeschke (Simulating Film Grain with the GIMP, Apr. 20, 2004, http://web.archive.org/web/20040420183648/http://gimpguru.org/Tutorials/FilmGrain/.*

Slump, C.H. et al.: "Image quality characteristic of a novel X-ray detector with multiple screen—CCd sensors for real-time diagnostic imaging" Proceedings of the SPIE, vol. 3032, 1997, pp. 60-71,XP002337554 USA.

* cited by examiner

*Primary Examiner*—Vikkram Bali
*Assistant Examiner*—Michelle Entezari
(74) *Attorney, Agent, or Firm*—Robert D. Shedd; Paul P. Kiel; Guy H. Eriksen

(57) ABSTRACT

The invention relates to a method and a device for processing a mosaic of noisy source images exhibiting overlap zones where at least two of the source images are superimposed.

According to the invention, the method comprises a step of generating a random noise (35) in the overlap zones so as to compensate at least partially for the deviation in noise between the overlap zones and the zones where the source images are not superimposed, called non-overlap zones.

8 Claims, 3 Drawing Sheets

FIG. 1: PRIOR ART
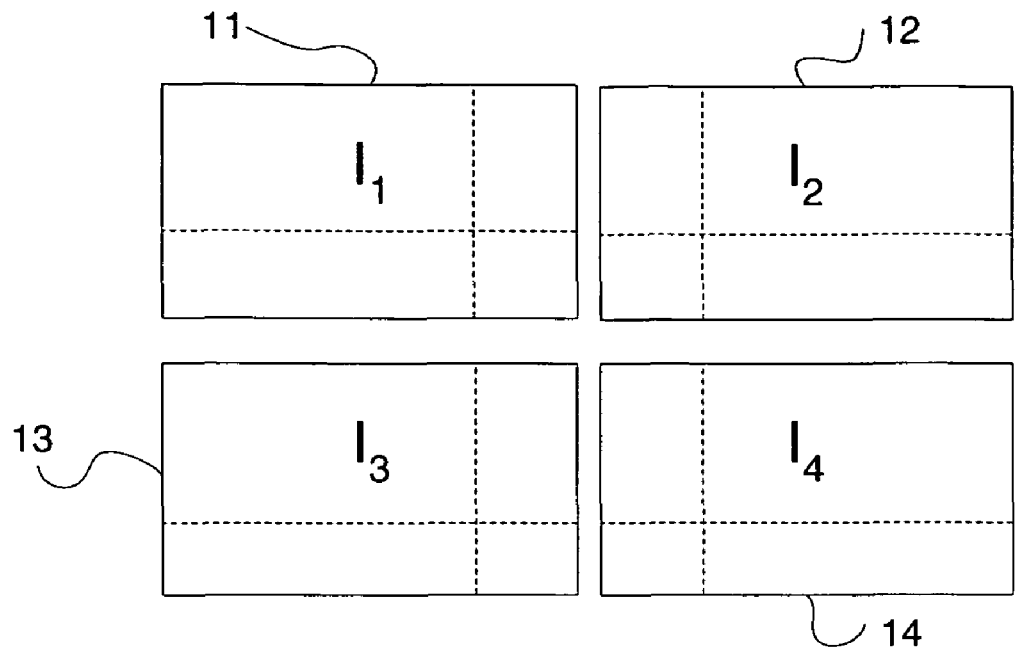
FIG. 2: PRIOR ART
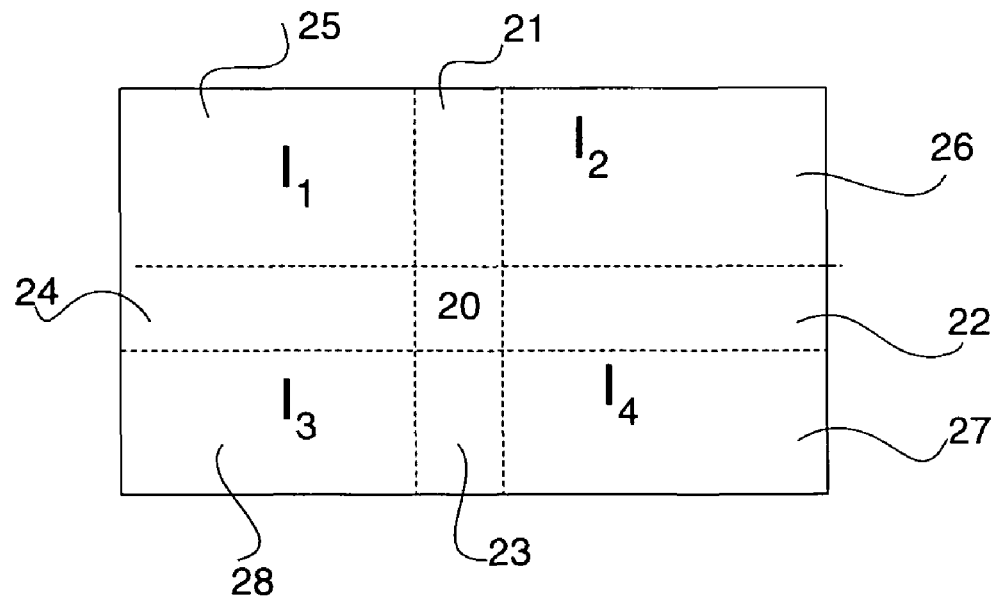

METHOD AND DEVICE FOR PROCESSING A MOSAIC OF IMAGES

This application claims the benefit, under 35 U.S.C. §119 of French Patent Application 0550052, filed Jan. 6, 2005.

1. FIELD OF THE INVENTION

The invention relates to a method and a device for processing mosaics of images aimed at improving the visual rendition of these mosaics.

2. STATE OF THE ART

The composition of source images to create a larger image, called a mosaic of images, is a well-known technique of image processing. This technique is used in particular in the field of space or aerial photography. It is also used in the multimedia field (for example for the creation of panoramic shots) or indeed in the field of large-screen video projection using several projectors. In the latter example, the size of the source images is adapted to the projection capability of the projectors. These small images are therefore combined so as to display a large-sized image on the screen. The use of several small projectors makes it possible in particular to reduce the cost of the hardware.

According to the state of the art, the techniques used to create these mosaics of images comprise a first optional step of predistortion of the source images. The objective of this step is to bring all the source images into one and the same geometric space. The second step of the process for creating the mosaic consists in mixing parts of images which overlap. To create mosaics it is also possible to use techniques of juxtaposition without overlap but the present invention does not relate to them.

FIG. 1 represents four source images $I_1$, $I_2$, $I_3$ and $I_4$. Each image is the sum of two components, namely a source image signal S and a source noise $n_S$. A mosaic represented in FIG. 2 is created from these images. This figure portrays various zones. The first zone 20 is the central overlap zone in which the four source images overlap. Zones 21, 22, 23 and 24 correspond to zones where two images overlap. Thus, zone 21 corresponds to the zone of overlap of images $I_1$ and $I_2$. Zone 22 corresponds to the zone of overlap of images $I_2$ and $I_4$. Zone 23 corresponds to the zone of overlap of images $I_3$ and $I_4$. Finally, zone 24 corresponds to the zone of overlap of images $I_1$ and $I_3$. Zones 25, 26, 27 and 28 correspond to parts of the source images that are not overlapped.

In the overlap zones, the simplest technique for mixing the source images consists, when there are two images to be mixed (zones 21, 22, 23 and 24), in calculating the half-sum of the two source images in the overlap zone. In the same way, when there are four images to be mixed (zone 20), the simplest technique consists in calculating the arithmetic average of the four source images in the overlap zone.

In a general manner, when mixing source images in the overlap zones 20, 21, 22, 23 and 24, two aspects are to be considered: the source image signal S and the source noise $n_S$. Thus, the grey level associated with a pixel with coordinates x and y in the image $I_1$ is:

$$I_1(x,y,c) = S_1(x,y,c) + n_{s_1}(x,y,c),$$

where c is the coloured component that is considered (i.e. blue, green or red).

In the overlap zone 21, the resulting averaged image $I_m$ is the half-sum of $I_1$ and $I_2$, hence:

$$I_m(x, y, c) = S_m(x, y, c) + n_m(x, y, c) = \frac{I_1(x, y, c) + I_2(x, y, c)}{2}$$

where $S_m(x,y,c)$ is the averaged image signal associated with the pixel with coordinates (x, y) for the coloured component c, and where $n_m(x,y,c)$ is the averaged noise associated with the pixel with coordinates (x, y) for the coloured component c.

With this technique, the average of the image signals $S_1$ and $S_2$, i.e.

$$S_m(x, y, c) = \frac{S_1(x, y, c) + S_2(x, y, c)}{2},$$

is calculated correctly. If the images are independent and if therefore the noises are decorrelated, the sum of the noises is quadratic. This implies that the amplitude of the summed noise is no longer correct since it is divided by a factor which equals $\sqrt{2}$ if $n_{s_1} = n_{s_2}$, i.e.

$$n_m(x, y, c) = \frac{n_{s_1}(x, y, c)}{\sqrt{2}}.$$

In the same way, if we consider zone 20 in which four images $I_1$, $I_2$, $I_3$ and $I_4$ overlap, the resulting averaged image $I_m$ is equal to:

$$I_m(x, y, c) = S_m(x, y, c) + n_m(x, y, c) = \frac{I_1(x, y, c) + I_2(x, y, c) + I_3(x, y, c) + I_4(x, y, c)}{4}$$

In this case also, the average of the image signals $S_1$, $S_2$, $S_3$ and $S_4$ is calculated correctly. However, the amplitude of the noise is also not correct since it is divided by a factor which equals 2 if $n_{s_1} = n_{s_2} = n_{s_3} = n_{s_4}$.

The amplitude of the noise being attenuated over the overlap zones results therefore in a smoothed appearance over these zones (20, 21, 22, 23, 14), thereby rendering them visible if the source images are not perfect and totally devoid of noise. This attenuation phenomenon is still more perceptible to the human eye in the uniform image zones where the noise then becomes a predominant component of the information displayed, as well as in video on account of the temporal component of the noise.

The phenomenon is further accentuated when four source images are superimposed (zone 20). The amplitude of the noise is then divided by 2, thereby rendering the difference with the source images yet more visible.

Thus, the essential problem induced by the mixing of the source images in the overlap zones is that the rendition of the mosaic is not homogeneous since the attenuation factor of the noise depends on the zone considered.

3. SUMMARY OF THE INVENTION

The aim of the invention is to alleviate these drawbacks of the prior art. More particularly, the objective of the present invention is to improve the rendition of the mosaic of images by making it uniform.

For this purpose, the invention proposes a method of processing a mosaic of noisy source images exhibiting overlap zones where at least two of the source images are superimposed. According to the invention, the method comprises a step of generating a random noise in the overlap zones so as to compensate at least partially for the deviation in noise between the overlap zones and the zones where the source images are not superimposed, called non-overlap zones.

According to a characteristic of the invention, in the overlap zones, the source images are mixed by effecting a weighted sum between the source images to be mixed.

According to a particular characteristic, the weighting function employed for an overlap zone varies linearly in the overlap zone in such a way as to decrease the proportion of one of the mixed images when moving spatially away from it. Advantageously, the random noise generated is a noise whose statistical parameters are estimated on the basis of parameters of the noise in the non-overlap zones and of parameters of the noise in the overlap zones.

According to a particular characteristic, one of the parameters estimated is the standard deviation of the noise.

Preferably, the parameters of the noise in the non-overlap zones are estimated locally over uniform zones of the source images.

The invention also relates to a device for processing a mosaic of noisy source images exhibiting overlap zones where at least two of the source images are superimposed. According to the invention, the device comprises means for generating the mosaic, and furthermore comprises:
- means for estimating statistical parameters of a random noise in the overlap zones and in the zones where the source images are not superimposed, called non-overlap zones, and
- means for generating a random noise in the overlap zones on the basis of statistical parameters.

4. LIST OF FIGURES

The invention will be better understood and illustrated by means of advantageous exemplary embodiments and modes of implementation, which are in no way limiting, with reference to the appended figures in which:

FIG. 1, already described, represents four source images used to create the mosaic of FIG. 2 according to the prior art;

FIG. 2, already described, represents the mosaic created according to the prior art on the basis of the four source images of FIG. 1 and identifies overlap zones and non-overlap zones;

5. DETAILED DESCRIPTION OF THE INVENTION

In order to make the visual rendition of the image mosaics more uniform, the invention consists in generating a correction noise just where the source noise $n_S$ is attenuated, that is to say in the overlap zones. The noise generated is dependent on the source noise attenuation caused by the mixing of the source images in these zones as well as on the characteristics of the source noise.

For this purpose, the invention consists, after having created an initial mosaic during a first step, in analysing, during a second step, the source noise $n_S$ present in the source images so as to estimate characteristic parameters thereof, for example the standard deviation. In a third step, the same characteristic parameters of the averaged noise $n_m$ present in the overlap zones are estimated. In a fourth step, the previously estimated parameters are used to estimate characteristic parameters of a correction noise. In a fifth step, these estimated parameters are used to generate a correction noise just where the source noise is attenuated, i.e. in the overlap zones. Finally, during the last step, the correction noise is added to the initial mosaic in the overlap zones so as to make the spatial characteristics of the final mosaic homogeneous and reduce the deviations in perception between the non-overlap zones corresponding to the source images and the various overlap zones corresponding to the averaged images.

Figure 3:
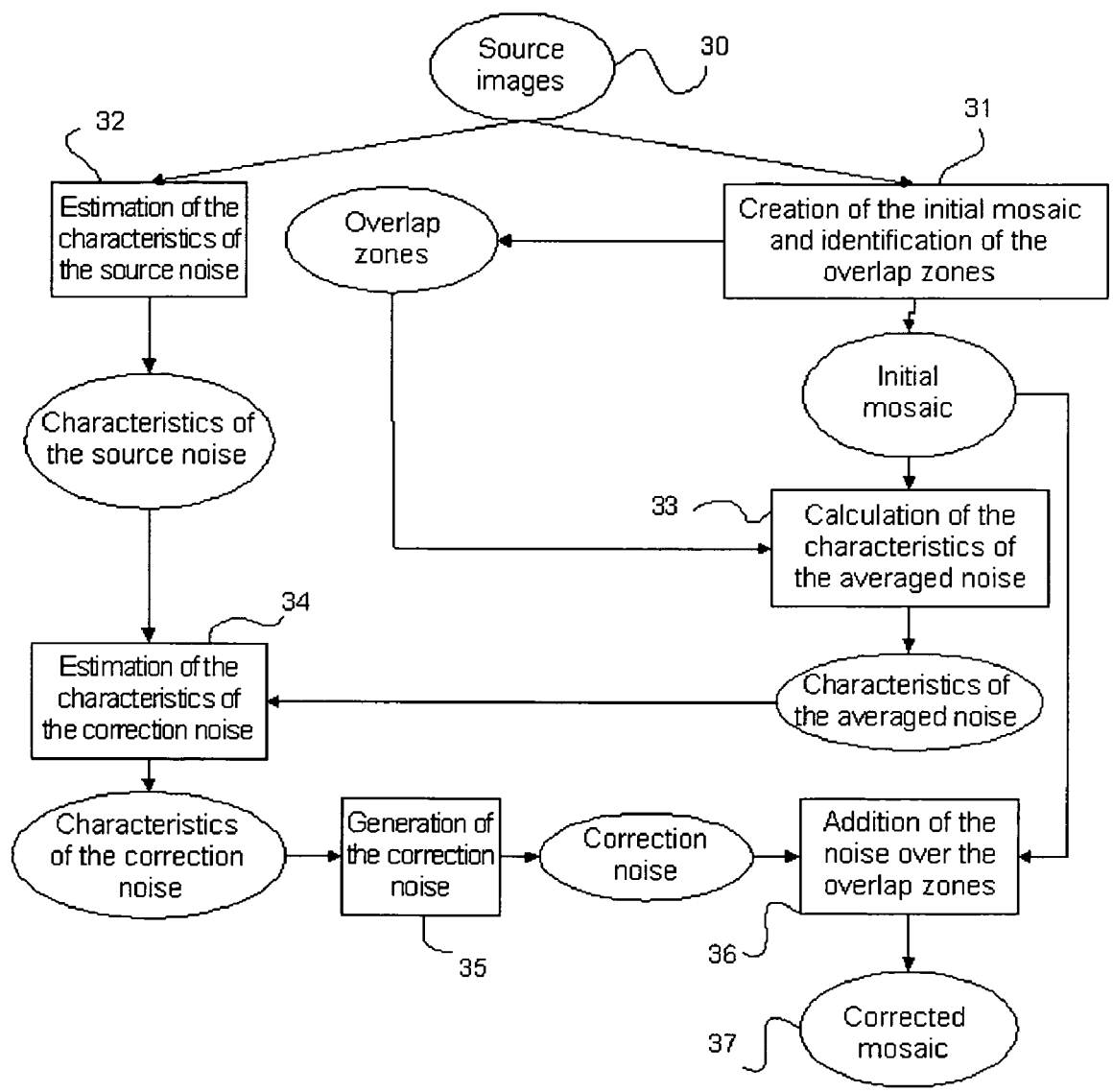
FIG. 3 illustrates a method of image processing according to the invention, aimed at improving the visual rendition of the mosaics.

The method according to the invention is illustrated by FIG. 3. The method comprises 6 steps referenced 31 to 36 in FIG. 3. In this figure, the modules represented are functional units, which may or may not correspond to physically distinguishable units. For example, these modules or some of them may be grouped together into a single component, or constitute functionalities of one and the same piece of software. On the other hand, certain modules may possibly be composed of separate physical entities.

Figure 4:
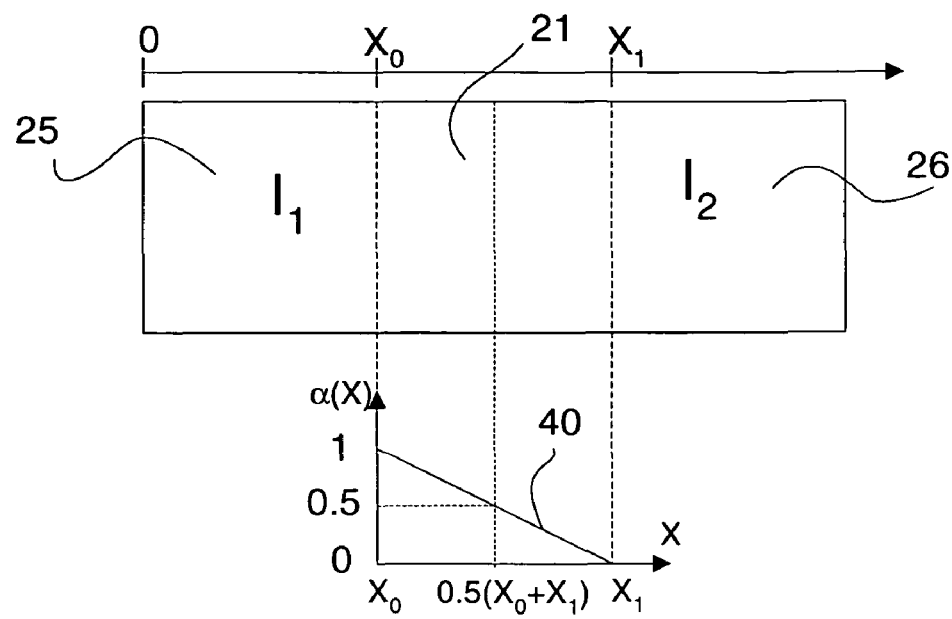
FIG. 4 represents a weighting function used during the mixing of two images in an overlap zone.

According to the invention, the first step 31 consists in creating a mosaic, called an initial mosaic, on the basis of the source images 30. During this step the overlap zones of the mosaic are also identified. In these overlap zones, the mixing of the source images is effected through a weighted sum of the images to be mixed. It is possible, for example, to decrease the proportion of one of the images when moving spatially away from it. Thus, in the overlap zone 21 it is possible to have a weighting between the images $I_1$ and $I_2$ which varies linearly from left to right, in such a way as to take more account of image $I_1$ in the left part of the overlap zone and of image $I_2$ in the right part of the overlap zone. Consequently, a pixel lying in the overlap zone 21 has as value: $I_m(x,y,c)=\alpha(x)I_1(x,y,c)+(1-\alpha(x))I_2(x,y,c)$, where $\alpha(x)$ is a weighting function such as that referenced 40 in FIG. 4. In this figure, $X_0$ and $X_1$ are the values of the abscissae of the pixels situated on the boundaries of the overlap zone 21. Thus, the function $\alpha(x)$ takes the value 1 if $x=X_0$, i.e. for the pixels situated on the left boundary of the overlap zone and it takes the value zero if $x=X_1$, i.e. for the pixels situated on the right boundary of the overlap zone.

Likewise, in the overlap zone 24 it is possible to have a weighting between the images $I_1$ and $I_3$ which varies linearly from top to bottom, in such a way as to take more account of image $I_1$ in the upper part of the overlap zone and of image $I_3$ in the lower part of the overlap zone. The same type of function as that described previously can be used.

During the second step 32, the analysis of the source noise $n_S$ is carried out with the aid of statistical image processing tools. The simplest approach consists in estimating the local average of the source image 30 with the aid of a low-pass filter. This average is then subtracted from the source image so as to extract locally the high frequencies. As a first approximation, these high frequencies are regarded as the source noise $n_S$. On the basis of these high frequencies, we therefore estimate local statistical characteristics of the source noise $n_S$. We estimate, for example, the standard deviation $\hat{\sigma}_S$ of the source noise for each of the three basic colours (green, blue and red). This estimation of the standard deviation is performed locally over uniform zones of the source images or else over zones whose average gradient can be estimated. Specifically, in order to properly estimate the noise, it is necessary to work on image zones for which it is possible to dispense with the useful signal S in order to estimate the noise alone.

According to a variant of the invention, it will be possible to use more complex noise models taking account of spatial and/or temporal characteristics of the source noise (e.g. autoregression models).

The third step 33 consists in estimating the averaged noise $n_m$ with standard deviation $\sigma_m$ resulting from the mixing of the source images. The standard deviation $\hat{\sigma}_m$ is calculated on the basis of the estimated source noise of standard deviation $\hat{\sigma}_S$, and by taking account of the way in which the mixing between the images in the overlap zone was performed during the creation of the mosaic in step 31 (e.g. weighted sum). It is also possible to estimate $\hat{\sigma}_m$ on the basis of the uniform zones of the overlap zone in the same way as $\hat{\sigma}_S$ was estimated in step 32.

The fourth step 34 consists in estimating characteristic parameters of a random correction noise $n_C$ by taking account of the statistical characteristics of the source noise (e.g. $\hat{\sigma}_S$) estimated in step 32 and by taking account of the statistical characteristics of the averaged noise (e.g. $\hat{\sigma}_m$) estimated in step 33. In the simple case where the only characteristic parameter considered is the standard deviation, we estimate the standard deviation of the synthetic noise $n_C$ as being the complementary standard deviation between the standard deviation of the estimated averaged noise $\hat{\sigma}_m$ and the standard deviation $\sigma_f$ of the final noise. In order to make the visual rendition of the mosaic homogeneous, it is necessary for the final noise to be equal to the estimated source noise. The standard deviation $\sigma_f$ is therefore equal to the standard deviation of the estimated source noise $\hat{\sigma}_S$. Furthermore, the final image results from the sum of the averaged image and of the image generated, given that the image generated is an image of correction noise $n_C$. This is manifested at the standard deviation level by the following relation: $\sigma_f^2 = \hat{\sigma}_S^2 = \hat{\sigma}_m^2 + \sigma_c^2$. Thus, the standard deviation $\hat{\sigma}_c$ of the correction noise $n_C$ to be generated is $\hat{\sigma}_c = \sqrt{\hat{\sigma}_S^2 - \hat{\sigma}_m^2}$. This operation must be performed for each colour. It may be performed locally.

The fifth step 35 consists in generating the noise $n_C$ of standard deviation $\hat{\sigma}_c$ over the overlap zones.

The last step 36 consists in generating the final mosaic 37. For this purpose, the correction noise $n_C$ of standard deviation $\hat{\sigma}_c$ is added to the initial mosaic in the overlap zones so as to obtain a corrected mosaic of more homogeneous visual appearance. In the non-overlapping zones (25, 26, 27 and 28), the final mosaic is equal to the zone of the initial image corresponding to the zone considered. Thus, zone 25 of the final image corresponds to a part of image $I_1$.

More precisely, a pixel with coordinates (x, y) of the corrected mosaic takes as value:

$I_1(x,y,c)$ if the pixel lies in zone 25;

$I_2(x,y,c)$ if the pixel lies in zone 26;

$I_4(x,y,c)$ if the pixel lies in zone 27;

$I_3(x,y,c)$ if the pixel lies in zone 28; or $I_m(x,y,c) + n_c(x,y,c)$ if the pixel lies in any one of the overlap zones 20 to 24.

One of the advantages of this step, in addition to making the visual rendition of the mosaic uniform, is to diminish the smoothed appearance over the overlapping zones.

Figure 5:
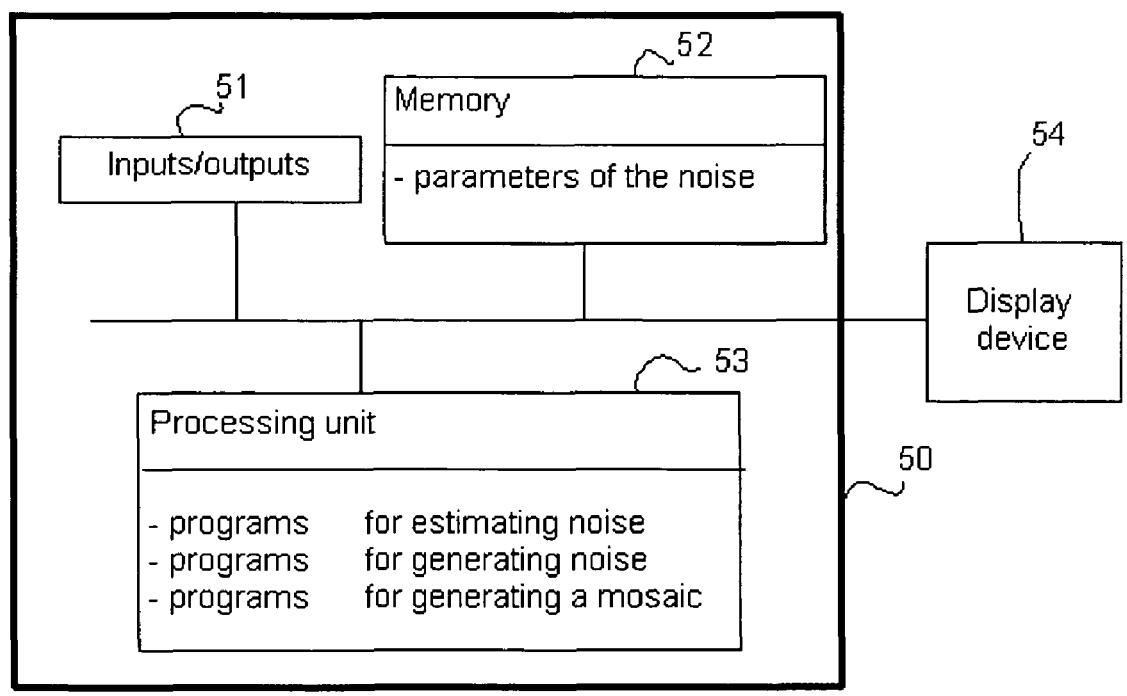
FIG. 5 illustrates a device for image processing according to the invention, aimed at improving the visual rendition of the mosaics.

The invention also relates to a device 50 aimed at implementing the method described previously. Only the essential elements of the device are represented in FIG. 5. The device according to the invention contains in particular a memory 52 in which are stored the estimated values of the characteristics of the various noises for the correction of the mosaic. The device also comprises a processing unit 53 such as a microprocessor or the like comprising the processing programs, in particular the program for estimating the noise parameters. The processing unit also comprises the functions for generating noise on the basis of the parameters estimated and stored in the memory 52. Furthermore, the device contains an input/output interface 51 for receiving the input video signal and in particular the source images serving to construct the mosaic. The interface also makes it possible to transmit the processed video signal, i.e. the final mosaic, according to the method of the invention to the display device 54.

The invention claimed is:

1. Method of processing a mosaic of noisy source images exhibiting overlap zones where at least two of the said source images are superimposed, wherein it comprises a step of generating a random noise only in the overlap zones so as to compensate at least partially for the deviation in noise between the overlap zones and the zones where the source images are not superimposed, called non-overlap zones.

2. Method according to claim 1, wherein, in the overlap zones, the source images are mixed by effecting a weighted sum between the source images to be mixed.

3. Method according to claim 2, wherein at the weighting function employed for an overlap zone varies linearly in the said overlap zone in such a way as to decrease the proportion of one of the mixed images when moving spatially away from it.

4. Method according to claim 1, wherein the random noise generated is a noise whose statistical parameters are estimated on the basis of parameters of the noise in the non-overlap zones and of parameters of the noise in the overlap zones.

5. Method according to claim 4, wherein one of the parameters estimated is the standard deviation of the noise.

6. Method according to claim 4, wherein the parameters of the noise in the non-overlap zones are estimated locally over uniform zones of the source images.

7. Device for processing a mosaic of noisy source images exhibiting overlap zones where at least two of the said source images are superimposed, comprising means for generating the said mosaic, wherein it furthermore comprises:

means for estimating statistical parameters of a random noise in the overlap zones and in the zones where the source images are not superimposed, called non-overlap zones, and means for generating a random noise in the overlap zones on the basis of said statistical parameters.

8. Device for processing a mosaic of noisy source images exhibiting overlap zones where at least two of the said source images are superimposed, comprising means for generating the said mosaic, wherein it furthermore comprises: means for estimating statistical parameters of a random noise in the overlap zones and in the zones where the source images are not superimposed, called non-overlap zones, and means for generating a random noise in the overlap zones on the basis of said statistical parameters, wherein it is used to implement the method according to claim 1.

* * * * *